J. RICHARD.
PHOTOGRAPHIC SHUTTER.
APPLICATION FILED FEB. 3, 1914.
1,201,764.
Patented Oct. 17, 1916.
2 SHEETS—SHEET 1.
Fig.1.
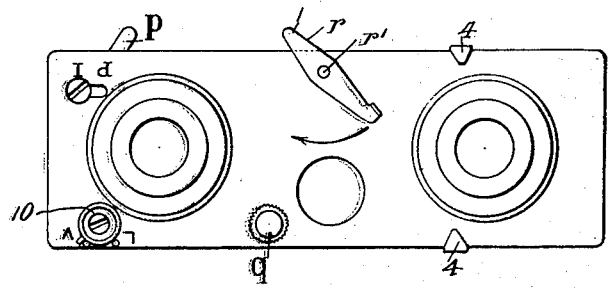
Fig.2.
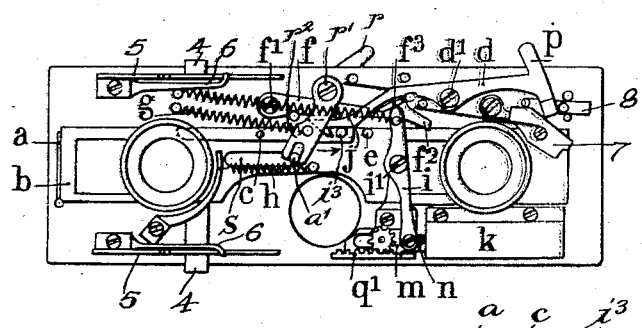
Fig.7.
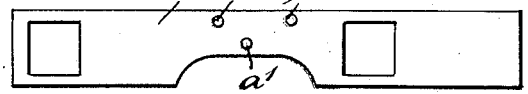
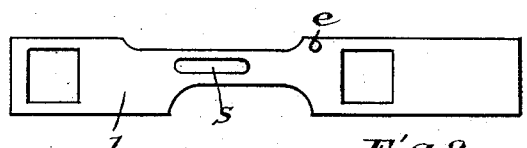
Fig.8.
Fig.5.
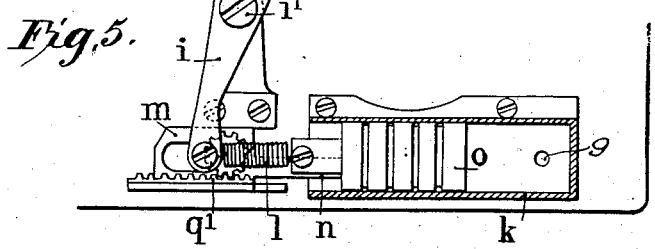
Witnesses:
M. J. Whittaker
G. McHulst
Inventor:
Jules Richard
per
H. W. Waghorn
Attorney.

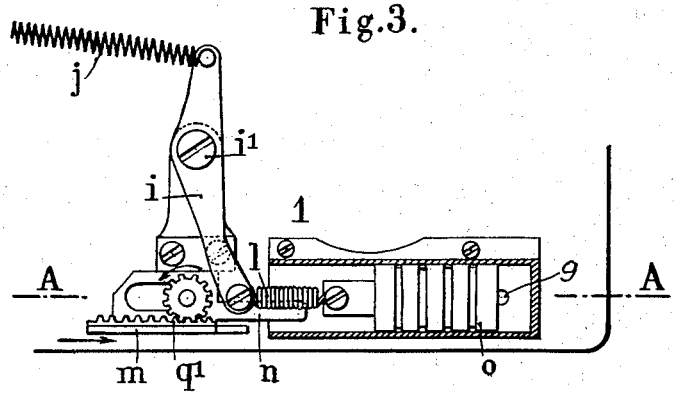
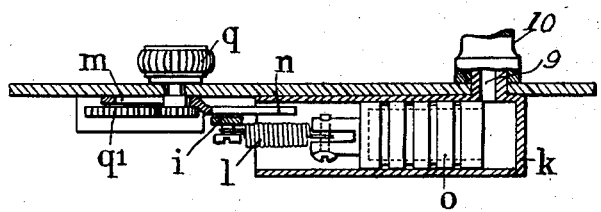
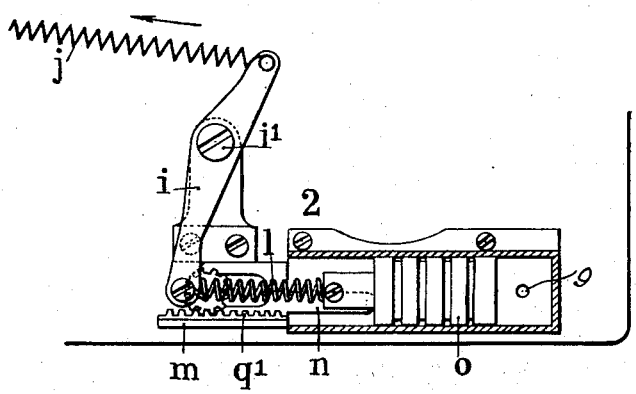

UNITED STATES PATENT OFFICE.

JULES RICHARD, OF PARIS, FRANCE.

PHOTOGRAPHIC SHUTTER.

1,201,764.  Specification of Letters Patent.  Patented Oct. 17, 1916.

Application filed February 3, 1914. Serial No. 816,243.

*To all whom it may concern:*

Be it known that I, JULES RICHARD, of 25 Rue Mélingue, in the city of Paris, Republic of France, have invented Improvements in Photographic Shutters, of which the following is a full, clear, and exact description.

When it is required to make an instantaneous exposure with photographic apparatus it is desirable, in most cases, that the shutter of such apparatus should operate with extreme rapidity. With leaf shutters in particular, which for many reasons are to be preferred to blind shutters, the speed is limited as much by the strength of the spring, which cannot exceed a certain value, as by the action of the brake provided to regulate the duration of the exposure, which always causes a certain resistance.

The present invention relates to an improvement in photographic shutters permitting the speed of the instantaneous operation of the shutter to be more than doubled, when this is desired.

The improvement comprises, in principle, the connection of the movable member of the brake by means of a spring to the lever controlling the release of the second leaf of the shutter, and the combination with this brake of a device for restraining the said movable member from moving, in such a manner that no departure from an ordinary setting of the parts is made when the shutter is operated to give an instantaneous exposure at a moderate or normal speed, while when it is required to give a very rapid instantaneous exposure, the brake is put completely out of action, and the supplementary spring adds its effect to that of the ordinary spring to effect the movement of the lever causing the release of the second leaf of the shutter.

The accompanying drawings show how the said invention can be conveniently and advantageously carried into practice in its application to a leaf shutter provided with an air brake.

In this drawing: Figure 1 is a front elevation of a shutter frame-plate. Fig. 2 is a rear elevation of the same. Fig. 3 is a detail view, partly in section, drawn to a larger scale, Fig. 4 shows a section on the line A—A, Fig. 3. Figs. 5 and 6 are detail views illustrating the operation of the shutter. Fig. 7 is a detail view of one of the shutter members. Fig. 8 is a detail view of the other shutter member.

As shown in this drawing, the shutter comprises two superposed leaves $a$ and $b$, arranged in the usual manner, the leaf $a$ provided with a pin $c$ which engages with the lip of a lever $d$ pivoted at $d^1$. The leaf $b$ is provided with a pin $e$ which can be retained by the lip $f^2$ of a lever $f$ pivoted at $f^1$. The leaf $a$ is under the control of a spring $g$, and the leaf $b$ is under the control of a spring $h$. The lever $f$ can be actuated by a lever $i$ pivoted at $i^1$. This lever is under the control of a spring $j$, it is moreover combined with an air brake or damper $k$.

In accordance with this invention, the lever $i$ is connected to the piston $o$ of the brake by a spring $l$, the coils of which touch each other and a slider $m$ carries a rod $n$ which can be moved so as to abut against the piston $o$.

To provide for setting the shutter or moving the same to retracted position, the plate $a$ is provided with a pin $a'$ which passes through a slot $s$ in plate $b$ and projects laterally therefrom. The pin $a'$ is engaged by the forked end of a lever $r^2$ pivoted at $r'$. A lever $r$ is connected to the forked lever $r^2$ and operates to swing the same about its pivot $r'$. A movement of the forked lever $r^2$ in the direction of the arrow in Fig. 2 will cause plates $a$ and $b$ to move toward the right, whereupon the pin $c$ carried by plate $a$ will be positioned behind the hooked end of the lever $d$ and the pin $e$ carried by plate $b$ will be positioned behind and engaged by the end $f^2$ of the lever $f$. During this movement of the plates $a$ and $b$, the pin $i^3$ will engage the upper end of the lever $i$ and move the same to the right. With the slider $m$ in the position shown in Fig. 5, the movement of the lever $i$ will draw the piston $o$ to the left within the cylinder $k$ without placing the spring $l$ under tension by reason of the construction thereof as hereinbefore described.

If the trigger $p$ is pressed the leaf $a$ is set free and, under the action of the spring $g$ moves toward the left and uncovers the lenses. This movement of the plate $a$ to the left withdraws pin $i^3$ from engagement with lever $i$ and permits said lever to turn about its pivot $i'$ under influence of the spring $j$. This lever $i$ as it reaches the end of its travel acts on the edge $f^3$ of the lever $f$ which thereupon sets free the pin $e$. The second leaf $b$ is then moved by the spring $h$ and covers the lenses. In both these movements, the spring $l$ acts as a connecting rod between the lever $i$ and the piston $o$ since for this purpose the spring is so made that the spirals thereof rest in contact with one another when the spring is not under tensile stress. However when the slider $m$ is put into the position 2, Fig. 6, this is no longer the case, but in setting the shutter the piston $o$ is prevented from moving in its cylinder by the rod $n$. From this it results that in setting the shutter, the spring $l$ is extended. The lever $i$ is therefore acted upon simultaneously by the ordinary spring $j$ and by the spring $l$ which now operates as a supplementary spring to the spring $j$.

At the instant of release, the lever $i$ turns under the combined action of the two springs $j$ and $l$. Moreover no resistance is opposed to its movement since the piston $o$ does not move in its cylinder. Under these circumstances the movement of the lever $i$ is accomplished very rapidly and the time elapsing between the movements of the first and second leaves of the shutter may be reduced to one five-hundredth of a second. This is a shutter speed which is more than double the speed which has heretofore been given by leaf shutters.

The slider $m$ may be controlled by a single trigger or preferably, as shown, it can be actuated by a milled button 9—carrying a pinion engaging in a rack 9'—integral with the slider, but any other suitable device can be employed for this purpose, for example, a lever or an eccentric.

By taking care to stop the movement of the piston by an appropriate setting of the rod $n$ or by any other suitable abutment, it is also possible to put the spring $l$ under slight tension, even in the case in which the shutter is required to give normal instantaneous exposure. It is also possible to combine a short movement of the piston with a corresponding extension of the spring, in such a manner that a series of speeds can be obtained intermediate to the normal and maximum speeds.

The numeral 4 designates stop indexes which have connection with diaphragms or plates, not shown, disposed between the main plate and the leaf or shutter $a$. These parts 4 also serve as operating means for said diaphragms. Notched plates 5 connected with the parts 4 coöperate with spring detents 6 attached to the main plate or frame to hold the parts 4 and diaphragms in the desired adjusted position.

The time mechanism embodies a lever 7 which coöperates with stops, not shown, on the shutters. A latch 8 holds the time mechanism out of action when instantaneous exposure is desired.

The cylinder $k$ of the dash-pot has an opening 9 which is controlled by a cap 10 or like part to regulate the flow of the air, whereby the speed of the piston $o$ is regulated.

The parts just referred to are disclosed in detail in English Patent No. 15,804, granted to me in 1907, and form no part of the present invention.

This invention is applicable to all shutters provided with a brake or damping device.

Claims:

1. In a shutter mechanism, a tensioned shutter member, means for holding the same in retracted position, releasing means for said holding means, retarding mechanism for said releasing means, means for holding the retarding mechanism out of action, and a spring connection between said retarding mechanism and said releasing mechanism.

2. In a shutter mechanism, a tensioned shutter member, means for holding the same in retracted position, releasing means for said holding means, a dash-pot, means for holding the movable member of the dash-pot in fixed position, and a spring connection between the movable member of said dash-pot and said releasing means.

3. In a shutter mechanism, a tensioned shutter member, means for holding the same in retracted position, releasing means for said holding means, retarding mechanism for said releasing means, means for holding the retarding mechanism out of action, a spring connection between said retarding mechanism and said releasing mechanism, and means for rendering said releasing mechanism inoperative.

4. In a shutter mechanism, a tensioned shutter member, means for holding the same in retracted position, releasing means for said holding means, a dash-pot, means for holding the movable member of the dash-pot in fixed position, a spring connection between the movable member of said dash-pot and said releasing means, and means for locking the movable member of said dash-pot.

5. A shutter mechanism comprising a pair of tensioned shutter members, separate means for holding said shutter members in retracted position under tension, releasing mechanism for each of said holding means, means carried by one of said shutter members for rendering the releasing mechanism of said other shutter member inoperative, retarding means, means for holding the retarding mechanism out of action, and a spring connecting said retarding means and said last-mentioned releasing mechanism.

The foregoing specification of my improvements in photographic shutters signed by me this 17th day of January, 1914.

JULES RICHARD.

Witnesses:
HANSON C. COXE,
RENÉ THIRIOT.